US010564305B2

United States Patent
Zhang et al.

(10) Patent No.: US 10,564,305 B2
(45) Date of Patent: Feb. 18, 2020

(54) EFFICIENT INTERNAL MULTIPLE PREDICTION METHODS

(71) Applicant: CONOCOPHILLIPS COMPANY, Houston, TX (US)

(72) Inventors: Yu Zhang, Houston, TX (US); Haiyan Zhang, Katy, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 15/370,412

(22) Filed: Dec. 6, 2016

(65) Prior Publication Data
US 2017/0168181 A1 Jun. 15, 2017

Related U.S. Application Data

(60) Provisional application No. 62/266,139, filed on Dec. 11, 2015.

(51) Int. Cl.
*G01V 1/36* (2006.01)
*G01V 1/30* (2006.01)

(52) U.S. Cl.
CPC .......... *G01V 1/36* (2013.01); *G01V 1/303* (2013.01); *G01V 2210/56* (2013.01)

(58) Field of Classification Search
CPC ....... G01V 1/303; G01V 1/36; G01V 2210/56
USPC ............... 702/14, 16, 18; 367/38, 73, 24
See application file for complete search history.

(56) References Cited

U.S. PATENT DOCUMENTS

| | | | | |
|---|---|---|---|---|
| 5,757,723 A | * | 5/1998 | Weglein | G01V 1/36 367/24 |
| 8,296,069 B2 | * | 10/2012 | Etgen | G01V 1/30 702/16 |
| 2009/0092007 A1 | | 4/2009 | Kitchenside | |
| 2013/0279293 A1 | * | 10/2013 | Xu | G01V 1/282 367/73 |
| 2016/0320509 A1 | * | 11/2016 | Almuhaidib | G01V 1/306 |

FOREIGN PATENT DOCUMENTS

WO 2015082419 A1 6/2015

OTHER PUBLICATIONS

Broggini, F., —Thesis—"Wave Field Autofocusing and Applications to Multidimensional Deconvolution and Imaging with Internal Multiples", Spring 2013, Colorado School of Mines, 52 pgs.
(Continued)

*Primary Examiner* — John H Le
(74) *Attorney, Agent, or Firm* — Polsinelli PC

(57) ABSTRACT

Methods for processing seismic data are described. The method includes: obtaining seismic data; solving a series of partial differential wave equations, wherein a first partial differential wave equation describes propagation of a seismic wave going from a first reflector to a second reflector, wherein a second partial differential wave equation describes propagation of a seismic wave going from a second reflector to a third reflector, and wherein a third partial differential wave equation describes propagation of a seismic wave going from a third reflector to a seismic receiver, wherein outputting predicted internal multiples for further imaging or attenuation.

20 Claims, 3 Drawing Sheets

(56) References Cited

OTHER PUBLICATIONS

Weglein, Arthur B., et al—"An inverse-scattering series method for attenuating multiples in seismic reflection data", 1997, Geophysics, vol. 62, No. 6, pp. 1975-1989; 15 pgs.
International Search Report, PCT/US2016/065139, dated Feb. 27, 2017; 2 pgs.
Pica, Antonio, et al—"Wave Equation Based Internal Multiple Modeling in 3D", 2008, SEG Las Vegas 2008 Annual Meeting, pp. 2476-2480; 5 pgs.
Malcolm, Alison E., et al—"A Method for Inverse Scattering Based on the Generalized Bremmer Coupling Series", 2005, Inverse Problems vol. 21, Issue No. 3, Institute of Physics Publishing, pp. 1137-1167; 31 pgs.

* cited by examiner

US 10,564,305 B2

EFFICIENT INTERNAL MULTIPLE PREDICTION METHODS

PRIOR RELATED APPLICATIONS

This application is a non-provisional application which claims benefit under 35 USC § 119(e) to U.S. Provisional Application Ser. No. 62/266,139 filed Dec. 11, 2015, entitled "EFFICIENT INTERNAL MULTIPLE PREDICTION METHODS," which is incorporated herein in its entirety.

FIELD OF THE DISCLOSURE

The present invention generally relates to a system and method for improving seismic images, and more particularly to a system and method for predicting and attenuating internal multiples during seismic image processing.

BACKGROUND OF THE DISCLOSURE

During seismic data acquisition, seismic sources generate seismic waves that propagate into the earth. Once underground, a seismic wave can reflect upward when it interacts with a reflector, which causes the seismic wave to return to the free surface where the signal can be detected by a seismic receiver. Seismic data collected at the surface is usually a composite signal that includes signals from primary reflection events as well as multiple reflection events. As used herein, the term "multiple" and its related terms refer to a reflection event in which a propagating seismic wave undergoes at least one downward reflection before reflecting upward to reach a seismic receiver. More particularly, an internal multiple is characterized by at least one downward reflection from a boundary or interface below the free surface with no downward reflection from the free surface. Internal multiples are created by changes in density or velocity of subterranean structure between the surface (earth surface or sea floor) and a target reflector (such as a hydrocarbon layer, fresh water aquifer, and so forth).

Multiples are generally undesirable for seismic imaging and techniques have been developed for attenuating multiples during pre-migration processing. Inverse scattering series is an established multiple attenuation technique that is attractive because of its purely data driven (sub-surface information is not required) approach. Inverse scattering series is powerful because it can be used to predict all internal multiples simultaneously in one run. However, a major drawback is that the computational cost of conventional inverse scattering series is significantly higher than other pre-stack processing and imaging flows. Currently, the computing cost for inverse scattering series is generally considered prohibitive for 3D seismic imaging applications involving real data.

SUMMARY OF THE DISCLOSURE

One example of a method for processing seismic data includes: obtaining seismic data; solving a series of partial differential wave equations, wherein a first partial differential wave equation describes propagation of a seismic wave going from a first reflector to a second reflector, wherein a second partial differential wave equation describes propagation of a seismic wave going from a second reflector to a third reflector, and wherein a third partial differential wave equation describes propagation of a seismic wave going from a third reflector to a seismic receiver, and generates internal multiples at the receiver locations.

Another example of a method of processing seismic data includes: obtaining seismic data; solving a series of partial differential wave equations, wherein a first partial differential wave equation describes propagation of a seismic wave going from a first reflector to a second reflector, wherein a second partial differential wave equation describes propagation of a seismic wave going from a second reflector to a third reflector, and wherein a third partial differential wave equation describes propagation of a seismic wave going from a third reflector to a seismic receiver, and outputs the predicted internal multiples.

DETAILED DESCRIPTION

Figure 1:
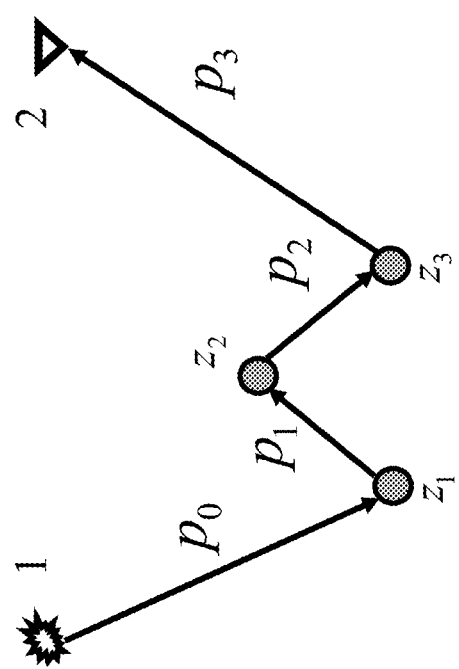
FIG. 1 illustrates a schematic representation of seismic wave propagating in the sub surface.

Turning now to the detailed description of the preferred arrangement or arrangements of the present invention, it should be understood that the inventive features and concepts may be manifested in other arrangements and that the scope of the invention is not limited to the embodiments described or illustrated.

The following examples of certain embodiments of the invention are given. Each example is provided by way of explanation of the invention, one of many embodiments of the invention, and the following examples should not be read to limit the scope of the invention.

Geoscientists often process acquired seismic data to improve interpretability of the seismic data. Seismic processing includes steps or operations that are intended to remove or attenuate undesirable noise, enhance signal, and the like. Specific examples of seismic processing steps include random noise (e.g., noise caused by weather) attenuation, free surface multiple prediction and attenuation (for offshore data), internal multiple prediction and attenuation, velocity modeling, and imaging/migration.

The present invention provides method and system for efficiently predicting and attenuating internal multiples by utilizing cascaded double-square-root one-way wave equations and proposing a partial differential equation (PDE) based internal multiple prediction method. This new method is mathematically equivalent to conventional inverse scattering series approach. Both the PDE-based approach and conventional ISS method are data-driven approaches that do not require a priori knowledge (e.g., location of reflectors, earth model type) of the subsurface. Computationally, the PDE-based approach is much more time efficient without sacrificing power or accuracy. For 2D application, the present invention can speed up internal multiple prediction by a factor of about 50 to 100. For 3D applications, the speed gain is even more dramatic, potentially improving computational efficiency by two orders of magnitudes or greater. Other advantages are apparent from the disclosure herein. "3D" refers to "three-dimensional," or any computer-generated image in which the displayed items have a length, width, and depth.

Internal Multiple Attenuation Approach Using Inverse Scattering Series

Inverse scattering series is largely based on scattering theory, which is a form of perturbation analysis in which perturbation in properties of a medium is related to perturbation in a wavefield that experiences the medium. The difference between actual and reference media can be characterized by a perturbation operator. The corresponding difference between actual and reference wavefields is referred to as the scattered wavefield. Forward scattering takes the reference medium, reference wavefield, and perturbation operator as inputs and outputs the actual wavefield. Inverse scattering takes the reference medium, reference wavefield, values of the actual field on the measurement surface as inputs and outputs the difference between actual and reference medium properties through the perturbation operator.

The collected seismic data may be processed (e.g., deghosting, free-surface multiple elimination, etc.) prior to undergoing internal multiple attenuation. The inverse scattering series constructs the perturbation operator through the action of applying Green's function operators to the seismic data. A subseries (removal series) of the inverse scattering series can be linearly combined with the seismic data in order to produce seismic data that is largely free of internal multiples. The inverse scattering series for attenuating all internal multiples chooses the leading and most significant contribution from the removal series of each order of multiple (thus forming a series that attenuates rather than fully eliminates). This subseries can be linearly combined with the seismic data to produce seismic data that is largely free of internal multiples. A detailed description of ISS for multiples attenuation can be found in U.S. Pat. No. 5,757,723 and (Weglein et al. 1997 Geophysics), relevant contents of which are hereby incorporated by reference.

Assuming 2-D wave propagation, equation (1) defines a first-order internal multiple attenuation term $b_3$ (portion of the third term of the internal multiple attenuation series) in f-k domain:

$$b_3 = \frac{1}{(2\pi)^2} \int_{-\infty}^{\infty} \int_{-\infty}^{\infty} dk_1 e^{-iq_1(\epsilon_g - \epsilon_s)} dk_2 e^{iq_2(\epsilon_g - \epsilon_s)} \quad (1)$$
$$\times \int_{-\infty}^{\infty} dz_1 e^{i(q_g + q_1)z_1} b_1(k_g, -k_1, z_1)$$
$$\times \int_{-\infty}^{z_1} dz_2 e^{i(-q_1 - q_2)z_2} b_1(k_1, -k_2, z_2)$$
$$\times \int_{z_2}^{\infty} dz_3 e^{i(q_2 + q_s)z_3} b_1(k_2, -k_s, z_3); \quad z_1 > z_2 \text{ and } z_2 < z_3$$

where $k_g$ and $k_s$ are Fourier conjugates of receiver and source coordinates respectively, $\omega$ is the temporal frequency, $q_g$ and $q_s$ are depth wavenumbers, $z_1$, $z_2$, and $z_3$ are the depth of three reflectors which generate the predicted internal multiples (FIG. 1), $b_1$ is the reflectivity model generated by prestack seismic data using Stolt migration, $b_3$ is the predicted internal multiples, $k_1$ and $k_2$ are the wavenumbers from either source side or the receiver side $q_1$, $q_2$ and $q_3$ are the single-square-root propagation operators defined in frequency-wavenumber domain (see equation 3 below) $\epsilon_g$–$\epsilon_s$ are small depth perturbations. Higher-order terms corresponds to higher-order internal multiples.

FIG. 1 illustrates a first-order internal multiple configuration. The seismic source is located at 1 and the seismic receiver is located 2. Both the source and the receiver are located at the free surface.

PDE Based Internal Multiple Attenuation

The present invention provides a PDE-based internal multiple prediction and attenuation approach. A 2-D acoustic wave equation for upcoming waves in frequency-space domain (neglecting spatial derivatives of velocity) can be written as equation (2):

$$\left(\frac{\partial}{\partial z} - iq\right) p_0(k; \omega; z; x_s) = -\delta(z) e^{ikx_s} \quad (2)$$

where $p_0(k; \omega; z; x_s)$ is Fourier conjugate to field point going from source to reflection at depth $z_1$. $\omega$ is radial frequency, $x_s$ is source coordinates, and q is given by equation (3):

$$q = \frac{\omega}{c}\sqrt{1 - \frac{c^2 k_x^2}{\omega^2}} \quad (3)$$

where c is velocity and $k_x$ is wavenumber, or Fourier conjugate of lateral propagation locations x.

Equation (4) describes 2-D propagation of an acoustic wave from reflector located at $z_1$ to reflector located at $z_2$:

$$\left(\frac{\partial}{\partial z} + iq\right) \hat{p}_1(k; \omega; z; k_s) = \int \hat{b}_1(k, -\vec{k'}; z) \hat{p}_0(\vec{k'}; \omega; z; k_s) d\vec{k'} \quad (4)$$

where $\hat{p}_0$ is Fourier transform of $p_0$, $\hat{p}_1$ is Fourier transform of $p_1$ which is Fourier conjugate to field point going from $z_1$ to $z_2$, $\hat{b}_1$ is Fourier transform of $b_1$ ($b_1$ is first term of inverse scattering series, constructed by seismic data), $\vec{k'}$ is wave vector directed towards observation point, and $k_s$ is Fourier conjugate of $x_s$.

Equation (5) describes propagation of the acoustic wave from reflector located at $z_2$ to reflector at $z_3$:

$$\left(\frac{\partial}{\partial z} - iq\right) \hat{p}_2(k; \omega; z; k_s) = -\int \hat{b}_1(k, -\vec{k'}; z) \hat{p}_1(\vec{k'}; \omega; z; k_s) d\vec{k'} \quad (5)$$

where $\hat{p}_2$ is Fourier transform of $p_2$ which is Fourier conjugate to field point going from $z_2$ to $z_3$.

Partial differential equation (6) describes propagation of the acoustic wave from reflector located at $z_3$ to receiver 2:

$$\left(\frac{\partial}{\partial z} + iq_g\right) \hat{p}_3(k_g; \omega; z; k_s) = \int \hat{b}_1(k_g, -\vec{k'}; z) \hat{p}_2(\vec{k'}; \omega; z; k_s) d\vec{k'} \quad (6)$$

where $\hat{p}_3$ is Fourier transform of $p_3$ which is Fourier conjugate to field point going from $z_3$ to receiver 2, $q_g$ is depth wavenumbers.

Solving for $\hat{p}_3$ where z=0 results in equation (7), $$\hat{p}_3(k_g;\omega;z=0;k_s) = \int_0^\infty \int_{-\infty}^\infty \int_{-\infty}^\infty e^{i(q_g + q_2)z_3} \int_0^{z_3} \int_{-\infty}^\infty e^{-i(q_2+q_1)z_2} \int_{z_2}^\infty \int_{-\infty}^\infty e^{i(q_1+q_s)z_1} \hat{b}_1(k_1;k_s;z_1) dz_1 \hat{b}_1(k_2;-k_1;z_2) dk_1 dz_2 \hat{b}_1(k_g;-k_2;z_3) dk_2 dz_3 \quad (7)$$

Equation (7) is equivalent to $b_3$, which is defined by equation (1). The new approach solves three wave equations (4, 5 and 6) sequentially. Solving each equation requires 4 computational loops over $\omega$, z and two $k_x$. Altogether, only at most 4 integration loops (p1, p2, p3, $\omega$) is required. Solving equation (7) at z=0 provides predicted internal multiples. The predicted internal multiples may be outputted on any suitable medium (e.g., computer screen, printout, mobile devices, etc.)

Figure 3:
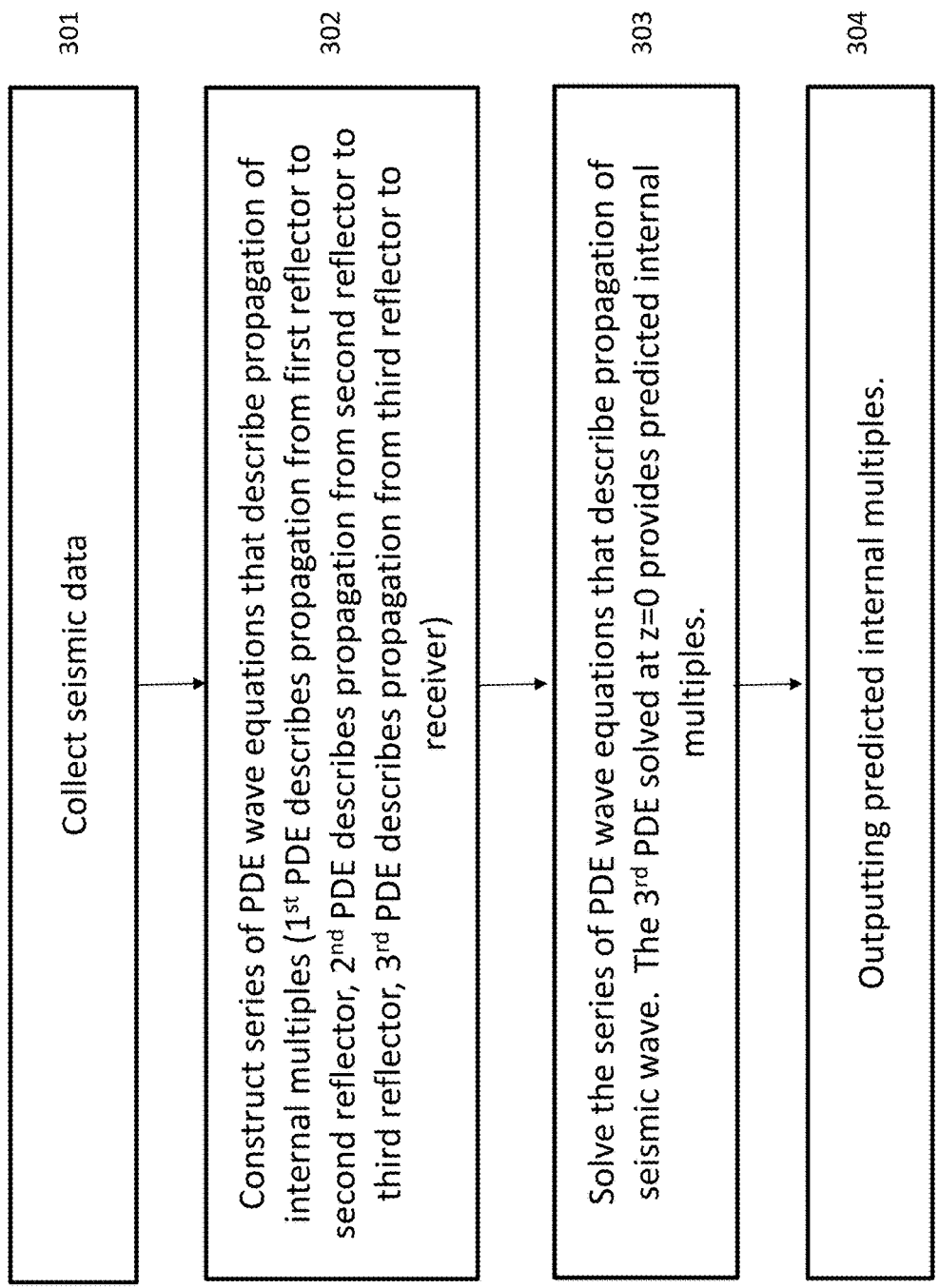
FIG. 3 shows a flow diagram that summarizes an embodiment of the invention.

FIG. 3 illustrates an embodiment of the present invention in a flow diagram. First step 301 involves collecting or obtaining seismic data. Typically, this seismic data will be a composite that includes contribution from internal multiples. This seismic data can be used to construct $b_1$, the first term of inverse scattering series. In the next step 302, a series of PDE wave equations can be constructed. Each PDE wave equation describes a reflected portion of the predicted internal multiples. In step 303, the series of PDE wave equations are solved. Each PDE wave equations solves a term that can be utilized to solve later PDE wave equation(s). The third PDE wave equation solved at z=0 provides predicted internal multiples. In the last step 304, the predicted internal multiples are outputted. The predicted internal multiples may be outputted on any suitable medium (e.g., computer screen, printout, mobile devices, etc.)

EXAMPLE

Figure 2:
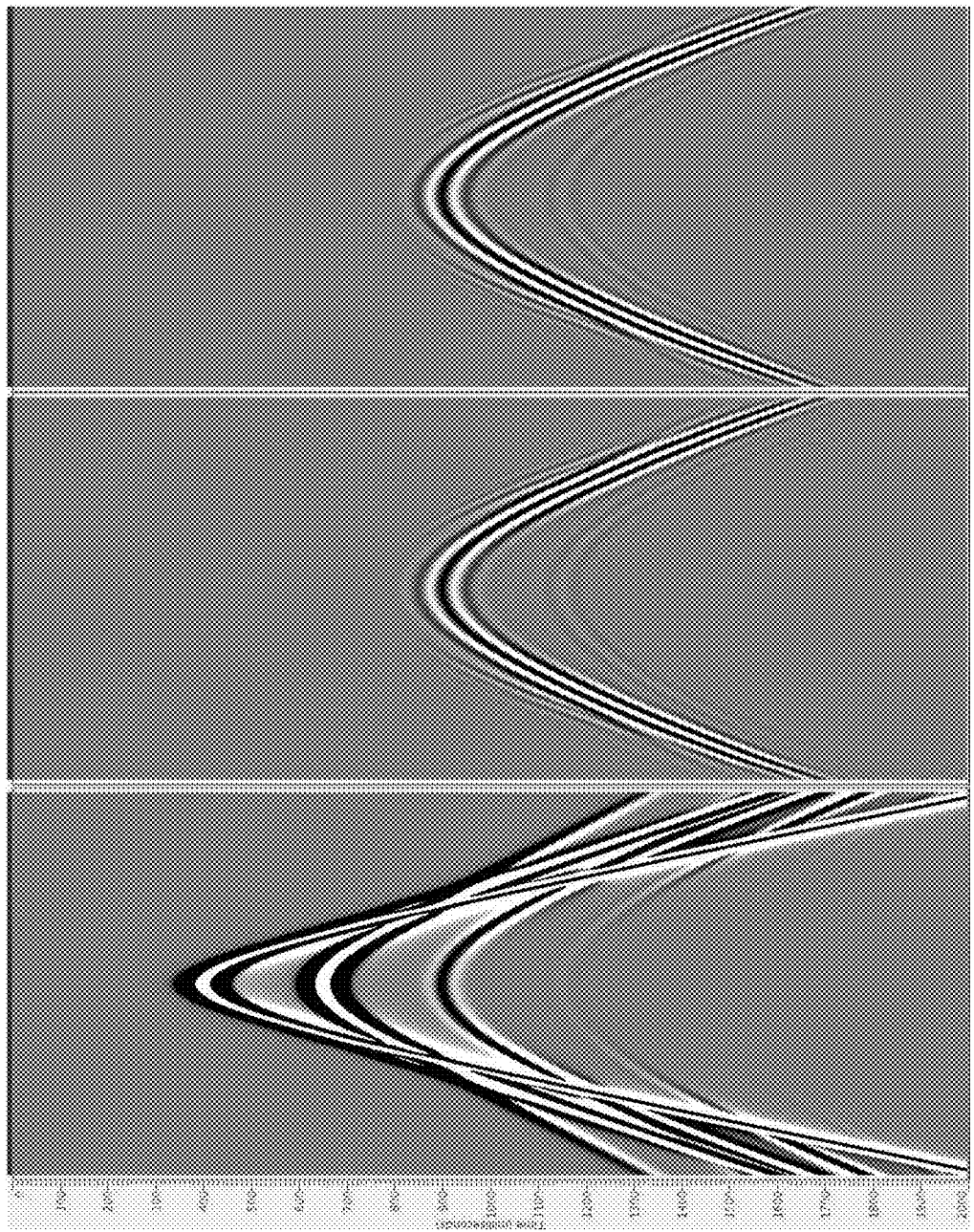
FIG. 2A-2C illustrates an embodiment of the invention as described in the Example.

Internal multiple prediction was performed on a 2-D synthetic data using method of the present invention and conventional inverse scattering series. The synthetic dataset contained 641 shots with 12.5 m shot interval and 12.5 m receiver interval. Sampling rate was 4 ms and trace length was 2 s. FIG. 2A illustrates a single shot record as the input seismic data for the multiple prediction, which includes both primary and the internal multiples. FIG. 2B shows the predicted internal multiples of the same shot record using PDE-based approach. FIG. 2C shows the predicted internal multiples of the same shot record using the conventional inverse scattering series approach. The two methods provide almost identical internal multiple predictions. However, the PDE-based approach took ~17 minutes while conventional inverse scattering series approach took ~28 hours. The speedup ratio of the present invention on this dataset is about 99 times. This ratio is expected to be more dramatic for 3D datasets. The use of computers is essential to process the seismic data quickly and effectively.

The foregoing patent application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in practical applications of the invention, at least some of the steps in the present inventive method are performed on or with the aid of a computer, i.e. the invention is computer implemented.

A suitable computer or computer system may be in communication with disk storage devices such as an external hard disk storage devices or conventional hard disk drives. These storage drives/devices can be implemented by way of a local area network or by remote access. The storage device may be used to store any and all of the program instructions, measurement data, and results as desired.

In one implementation, data may be stored in disk storage device. The system computer may retrieve the appropriate data from the disk storage devices to process data according to program instructions that correspond to implementations of various techniques described herein. The program instructions may be written in a computer programming language, such as C++, Java and the like. The program instructions may be stored in a computer-readable medium, such as program disk storage device. Such computer-readable media may include computer storage media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer. Combinations of any of the above may also be included within the scope of computer readable media. In one implementation, the system computer may present output primarily onto graphics display, or alternatively via printer.

What is claimed is:

1. A method for seismic data processing comprising:
   obtaining seismic data for a subterranean structure, the seismic data including contribution from internal multiples;
   solving a series of partial differential wave equations each representing a reflected portion of predicted internal multiples of the seismic data, wherein a first partial differential wave equation describes propagation of a seismic wave going from a first reflector to a second reflector, wherein a second partial differential wave equation describes propagation of the seismic wave going from the second reflector to a third reflector, and wherein a third partial differential wave equation describes propagation of the seismic wave going from the third reflector to a seismic receiver, the third partial differential wave equation providing the predicted internal multiples;
   outputting the predicted internal multiples for attenuation; and
   removing the predicted internal multiples from an image of the subterranean structure.

2. The method of claim 1, wherein the series of partial differential wave equations are solved sequentially.

3. The method of claim 1, wherein at least one of the series of partial differential wave equations describes 2-D or 3-D propagation of the seismic wave.

4. The method of claim 1, wherein the first partial differential equation is $$\left(\frac{\partial}{\partial z} + iq\right)\hat{p}_1(k;\omega;z;k_s) = \int \hat{b}_1(k;-\vec{k}';z)\hat{p}_0(\vec{k}';\omega;z;k_s)d\vec{k}',$$

wherein z is depth between $z_1$ and $z_2$, $\hat{p}_0$ is Fourier transform of $p_0$ which is Fourier conjugate to field point going from source to the reflections above depth $z_1$, $\hat{p}_1$ is Fourier transform of $p_1$ which is Fourier conjugate to field point going from $z_1$ to $z_2$, $\hat{b}_1$ is Fourier transform of $b_1$ ($b_1$ is first term of inverse scattering series), $\vec{k}'$ is wave vector directed towards observation point, and $k_s$ is Fourier conjugate of $x_s$, $\omega$ is radial frequency, $k_s$ is Fourier conjugate of $x_s$ which is source coordinates, and $$q = \frac{\omega}{c}\sqrt{1 - \frac{c^2 k_x^2}{\omega^2}}$$

wherein c is velocity and $k_x$ is wavenumber.

5. The method of claim 1, wherein the second partial differential equation is $$\left(\frac{\partial}{\partial z}-iq\right)\hat{p}_2(k;\omega;z;k_s)=-\int \hat{b}_1(k;-\vec{k'};z)\hat{p}_1(\vec{k'};\omega;z;k_s)d\vec{k'},$$

wherein $\hat{p}_2$ is Fourier transform of $p_2$ which is Fourier conjugate to field point going from $z_2$ to $z_3$.

6. The method of claim 1, wherein the third partial differential equation is $$\left(\frac{\partial}{\partial z}+iq_g\right)\hat{p}_3(k_g;\omega;z;k_s)=\int \hat{b}_1(k_g;-\vec{k'};z)\hat{p}_2(\vec{k'};\omega;z;k_s)d\vec{k'},$$

wherein $\hat{p}_2$ is Fourier transform of $p_3$ which is Fourier conjugate to field point going from $z_3$ to the seismic receiver, $q_g$ is depth wavenumbers, and $k_g$ is Fourier conjugate of $x_g$ which is receiver coordinates.

7. The method of claim 1, wherein the seismic data is 2-D or 3-D.

8. A method for seismic data processing comprising:
obtaining seismic data for a subterranean structure, the seismic data including contribution from internal multiples;
solving a series of partial differential wave equations each representing a reflected portion of predicted internal multiples of the seismic data, wherein a first partial differential wave equation describes propagation of a seismic wave going from a first reflector to a second reflector, wherein a second partial differential wave equation describes propagation of the seismic wave going from the second reflector to a third reflector, and wherein a third partial differential wave equation describes propagation of the seismic wave going from the third reflector to a seismic receiver, the third partial differential wave equation providing the predicted internal multiples; and
outputting the predicted internal multiples.

9. The method of claim 8, wherein the series of partial differential wave equations are solved sequentially.

10. The method of claim 8, wherein at least one of the series of partial differential wave equations describes 2-D or 3-D propagation of the seismic wave.

11. The method of claim 8, wherein the first partial differential equation is $$\left(\frac{\partial}{\partial z}+iq\right)\hat{p}_1(k;\omega;z;k_s)=\int \hat{b}_1(k;-\vec{k'};z)\hat{p}_0(\vec{k'};\omega;z;k_s)d\vec{k'},$$

wherein z is depth between $z_1$ and $z_2$, $\hat{p}_0$ is Fourier transform of $p_0$ which is Fourier conjugate to field point going from source to reflection at depth $z_1$, $\hat{p}_1$ is Fourier transform of $p_1$ which is Fourier conjugate to field point going from $z_1$ to $z_2$, $\hat{b}_1$ is Fourier transform of $b_1$ ($b_1$ is first term of inverse scattering series), $\vec{k'}$ is wave vector directed towards observation point, and $k_s$ is Fourier conjugate of $x_s$, $\omega$ is radial frequency, $k_s$ is Fourier conjugate of $x_s$ which is source coordinates, and $$q=\frac{\omega}{c}\sqrt{1-\frac{c^2 k_x^2}{\omega^2}}$$

wherein c is velocity and $k_x$ is wavenumber.

12. The method of claim 8, wherein the second partial differential equation is $$\left(\frac{\partial}{\partial z}-iq\right)\hat{p}_2(k;\omega;z;k_s)=-\int \hat{b}_1(k;-\vec{k'};z)\hat{p}_1(\vec{k'};\omega;z;k_s)d\vec{k'},$$

wherein $\hat{p}_2$ is Fourier transform of $p_2$ which is Fourier conjugate to field point going from $z_2$ to $z_3$.

13. The method of claim 8, wherein the third partial differential equation is $$\left(\frac{\partial}{\partial z}+iq_g\right)\hat{p}_3(k_g;\omega;z;k_s)=\int \hat{b}_1(k_g;-\vec{k'};z)\hat{p}_2(\vec{k'};\omega;z;k_s)d\vec{k'},$$

wherein $\hat{p}_3$ is Fourier transform of $p_3$ which is Fourier conjugate to field point going from $z_3$ to the seismic receiver, $q_g$ is depth wavenumbers, and $k_g$ is Fourier conjugate of $x_g$ which is receiver coordinates.

14. The method of claim 8, wherein the seismic data is 2-D or 3-D.

15. A system for seismic data processing comprising:
one or more seismic sources generating at least one seismic wave propagating into a subterranean structure;
a plurality of reflectors reflecting the at least one seismic wave, the plurality of reflectors including a first reflector, a second reflector, and a third reflector;
one or more seismic receivers capturing seismic data for the subterranean structure following reflection of the at least one seismic wave from the plurality of reflectors, the seismic data including contribution from internal multiples; and
a computer system generating predicted internal multiples by solving a series of partial differential wave equations each representing a reflected portion of the predicted internal multiples of the seismic data, the series of partial differential wave equations including a first partial differential wave equation, a second partial differential wave equation, and a third partial differential wave equation, the first partial differential wave equation describing propagation of the at least one seismic wave from the first reflector to the second reflector, the second partial differential wave equation describing propagation of the at least one seismic wave from the second reflector to the third reflector, the third partial differential wave equation describing propagation of the at least one seismic wave from the third reflector to the one or more seismic receivers.

16. The system of claim 15, wherein the series of partial differential wave equations are solved sequentially.

17. The system of claim 15, wherein at least one of the series of partial differential wave equations describes 2-D or 3-D propagation of the at least one seismic wave.

18. The system of claim 15, wherein the seismic data is 2-D or 3-D.

19. The system of claim 15, wherein the computer system removes the predicted internal multiples from a seismic image of the subterranean structure.

20. The system of claim 15, wherein the computing system outputs the predicted internal multiples.

* * * * *